United States Patent [19]

Albonico

[11] Patent Number: 4,489,813
[45] Date of Patent: Dec. 25, 1984

[54] PADDED SHOE BRAKE, PARTICULARLY FOR BICYCLES

[75] Inventor: Franco Albonico, Como, Italy
[73] Assignee: Meccanotex S.p.A., Lurago D'Erba, Italy
[21] Appl. No.: 345,115
[22] Filed: Feb. 2, 1982
[30] Foreign Application Priority Data
 Feb. 3, 1981 [IT] Italy .............................. 19480 A/81
[51] Int. Cl.³ ........................... B60T 1/06; B62L 1/06
[52] U.S. Cl. .................................. 188/24.21; 188/2 D
[58] Field of Search .............. 188/2 D, 24.11, 24.12, 188/24.13, 24.18, 24.19, 24.21, 24.22, 218 A, 26, 29, 73.1, 250 B

[56] References Cited

U.S. PATENT DOCUMENTS 2,160,181  5/1939  Taylor .............................. 188/24.19
3,878,920  4/1975  Fugii ............................... 188/24.21

FOREIGN PATENT DOCUMENTS 2626338 12/1976 Fed. Rep. of Germany ... 188/218 A
419978   1/1911 France ............................ 188/24.11
441490   9/1949 Italy .............................. 188/24.11
179277   5/1922 United Kingdom ............. 188/24.21
294375   7/1928 United Kingdom ............. 188/24.19
332981   8/1930 United Kingdom ........... 188/218 A

*Primary Examiner*—Douglas C. Butler
*Assistant Examiner*—R. R. Diefendorf
*Attorney, Agent, or Firm*—Guido Modiano; Albert Josif

[57] ABSTRACT

The padded shoe brake comprises a pair of shoe pads, the wheel rim mating surface of which has a hollow shape and is adapted to continuously encompass both sides and an inner annular portion of the wheel rim, a control and guiding assembly being operative to move the shoe pads along paths which intersect the wheel rim between the sides and the inner annular portion of the wheel rim.

13 Claims, 8 Drawing Figures

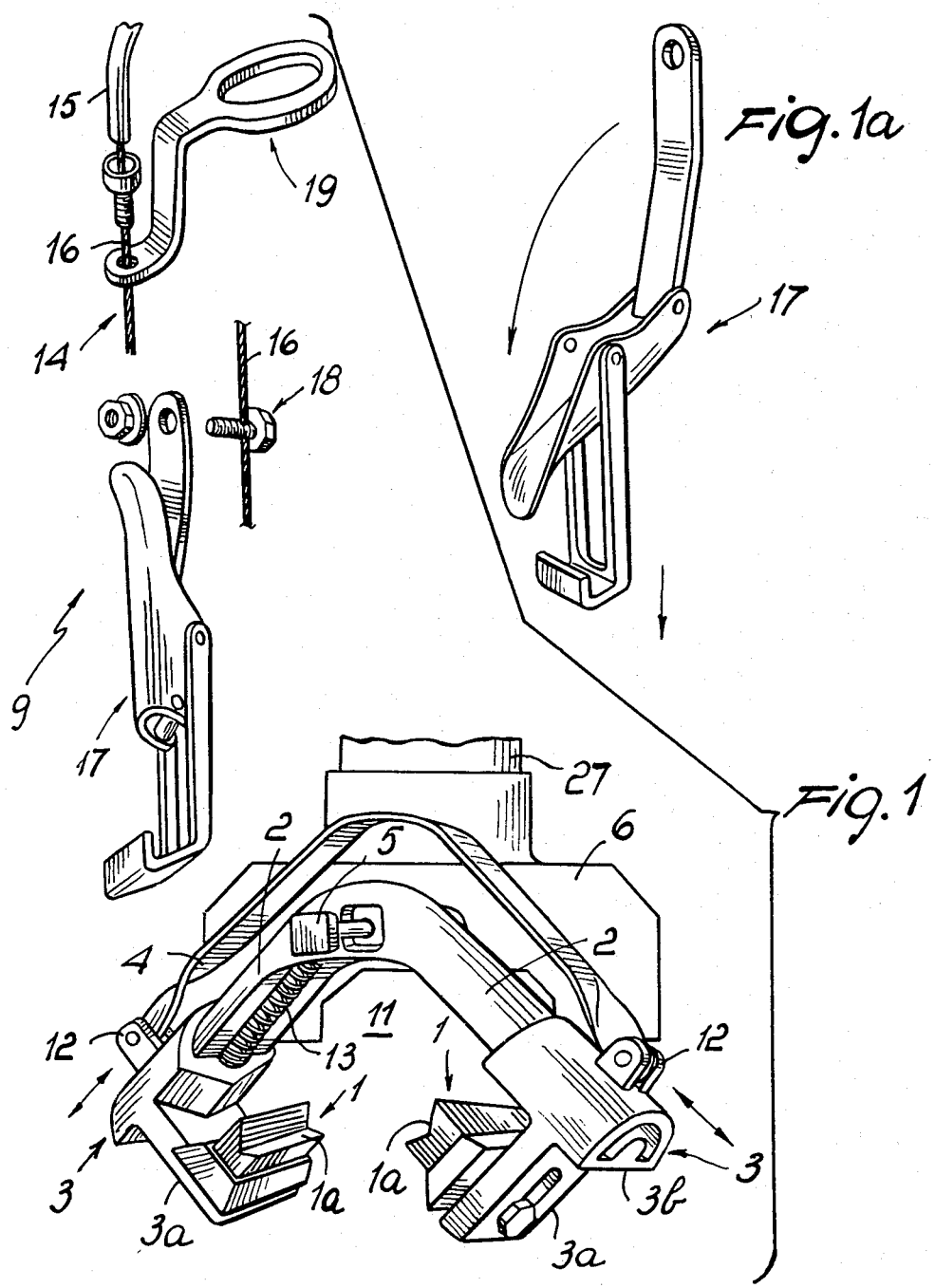

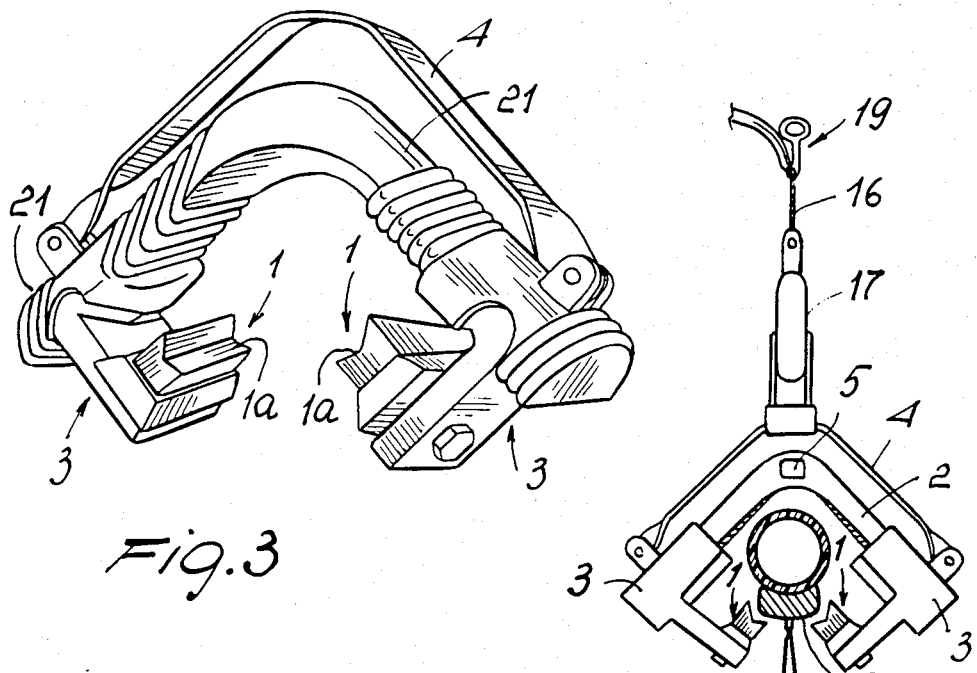
Fig.3
Fig.2
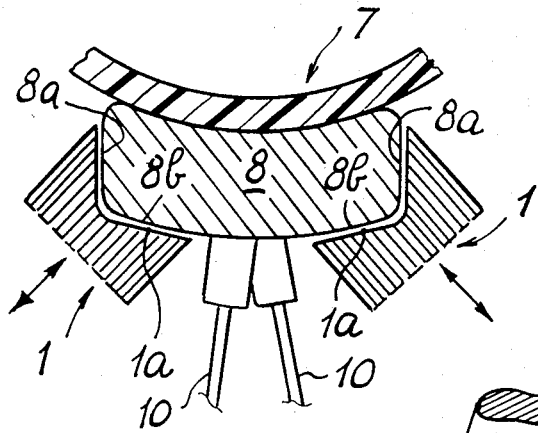
Fig.2a
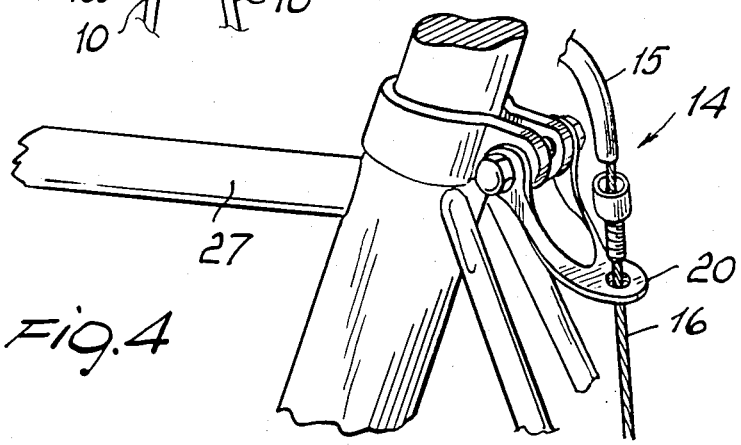
Fig.4

PADDED SHOE BRAKE, PARTICULARLY FOR BICYCLES

BACKGROUND OF THE INVENTION

This invention relates to a padded shoe brake, particularly for bicycles. More generally the invention relates to a padded shoe brake capable of an improved action and having an improved structure suitable for use on all types of two-wheel light vehicles, such as bicycles, motorcycles, mopeds, and the like.

As is known, lightweight two-wheel vehicles, and bicycles especially, generally utilize brakes which are designed to exert a braking friction action on an edge portion of a wheel assembly, more specifically on the wheel rim. Such brakes have won widespread acceptance on account of their extremely low weight, and because they do not affect by their presence the wheel structure, which may include at the center, for instance, a simple hub of small diameter. Quite different is the situation with drum and disk brakes, which, while being on the one hand efficient have, on the other hand a relatively heavy and complex construction, which has to be taken into account when the center portion of the wheel is designed apart from the significant increase of the wheel overall weight.

Padded shoe brakes may be regarded as falling into two general classes. In accordance with one solution, related to the so-called "rod-control" brakes, the shoe pads are supported on a fork of inverted-U configuration, which encompasses a portion of the tire and rim assembly and carries at its ends pads or blocks extending parallel to the plane containing the wheel. Such shoe pads are, therefore, adapted to act on the inner annular portion of the rim, which is located close to and at the side of the wheel spokes. According to another solution, related to the so-called "caliper" brakes, the pads are carried on arcuate lever arms which position the pads adjacent the sides of the rim. The braking action is here provided by the simultaneous actuation, through a Bowden cable, of both lever arms carrying the braking pads.

Both of the basic technical solutions just described are carried out into pratice in the form of a number of practical variations in which, however, the principle on which the brakes are based does not change. More specifically they have advantages and disadvantages, which condition their application in each individual case. In particular, the "rod-control" brakes are very strong, have a symmetrical structure, and have long been in use, but are relatively heavy and mechanically complex. The "caliper" brakes, in the most widespread modification thereof, are light in weight and simple, but are unbalanced because they are actuated asymmetrically with respect to the wheel mid-plane. Moreover, the lever arms may interfere with the vehicle main frame as the handle bars are turned beyond a certain angle, or in the event of a fall.

However, the main drawback affecting padded shoe brakes, which is common to all of their practical embodiments currently in use, lies in the comparatively low efficiency of these brakes in their braking action on the wheel rotational speed. This inherent shortcoming is quite familiar to those skilled in the art. This is somewhat confirmed by the fact that a great number of attempts have been made heretofore to improve the braking action of the padded shoe brakes.

In actual practice, these attempts have been unsuccessful, and the utilization of padded shoe brakes has been exclusively limited, as is known, to the lightest of two-wheel vehicles, namely bicycles.

A fundamental technical reason why the efficiency of such brakes is low is due to the reduced friction area available between the pads and rim, which is in turn due to the narrow profile of the rim, which is designed to just meet the technical requirements of the wheel.

Known pads, by acting either on the sides of the rim, or alternatively on an inner annular portion thereof adjacent the wheel spokes, only have available a small area in the direction transverse to the wheel. Of course, in the circumferential direction, the available surface area is much larger, but on the one hand it is unpractical and functionally disadvantageous to adopt pads which extend over an arc of a circle and, on the other hand, it is technically and practically unacceptable, at least with light vehicles, to adopt plural pads in series with one another.

The net result is that the only technically feasible solutions, and those actually adopted heretofore, for the improvement of the padded shoe brake action have been limited to the knurling of the rim edges, improvements in the pad material, a careful adjustment of the shoe pad movement controlling elements, and an increase in the lever arms involved in controlling the shoe pads, to allow for a given applied effort an increased force applied by the pads to the rim.

Even with such improvements, however, the action of padded shoe brakes is only acceptable, as mentioned, for bicycle use.

SUMMARY OF THE INVENTION

In view of the foregoing situation, and of the importance that may be attached to padded shoe brakes on account of their inherent lightness and simplicity, it is a primary object of this invention to provide a novel padded shoe brake which has higher efficiency features, in particular by virtue of an increased surface area of contact with the wheel rim.

It is another object of this invention to provide a novel padded shoe brake which, while having a significantly improved braking efficiency over conventional padded shoe brakes, is of very simple construction and which can be readily and economically manufactured by the involved industry.

A further object is to provide such a padded shoe brake wherein the braking action can be graduated in order to be of progressive type, thus controlling the braking with accuracy.

Yet another object of this invention is to provide a padded shoe brake having a symmetrical structure with respect to the frame whereon it is mounted, as well as being suitable for application on virtually any frame type.

These and other objects, such as will be apparent hereinafter, are achieved by a padded shoe brake, particularly for bicycles, comprising a pair of shoe pads adapted to frictionally engage a wheel rim, and shoe pad control and guiding means operative to move said shoe pads to and from said wheel rim while maintaining said shoe pads at a position of substantial symmetry with respect to said wheel rim, characterized in that said shoe pads have a rim-contacting surface of hollow shape and adapted to continuously encompass both the sides and an inner annular portion of said wheel rim, and that said control and guiding means are mechanically structured to bring said shoe pads closer to said wheel rim along paths substantially reaching said sides and said inner annular portions of said wheel rim.

BRIEF DESCRIPTION OF THE DRAWINGS

Further features and advantages will be more clearly understood from the following description of some preferred, but not limitative, embodiments of this invention, with reference to the accompanying illustrative drawings, where:

FIG. 1 shows partly in perspective and partly in exploded view the overall structure of the inventive brake, as provided, by way of example, to the front or steering fork of a bicycle frame;

FIG. 1a illustrates the operation of one detail of FIG. 1;

FIG. 2 shows schematically the brake of FIG. 1 mounted on a wheel;

FIG. 2a is a sectional view of a detail of FIG. 2, with the brake shoe pads at a position closely adjacent the wheel rim;

FIG. 3 shows in perspective the appearance of the inventive brake when finished with an outer rubber protection;

FIG. 4 illustrates a control connected to the rear brake of a bicycle;

DESCRIPTION OF THE PREFERRED EMBODIMENTS

Figure 5:
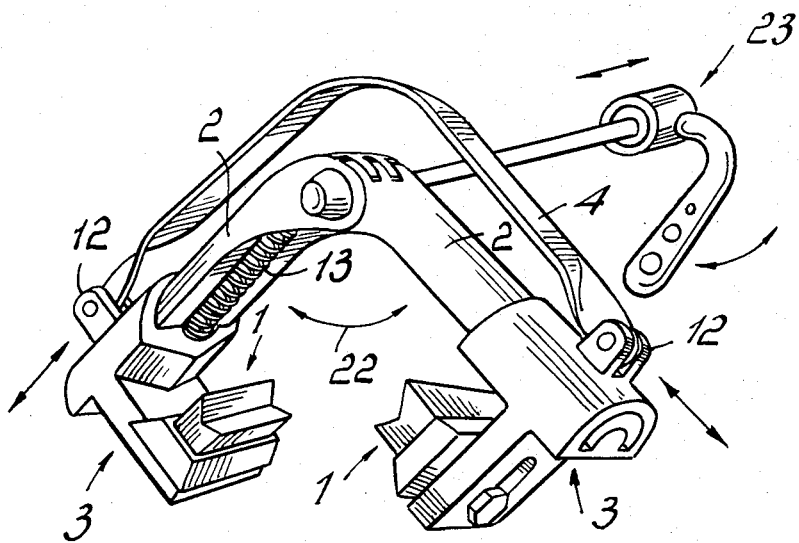
FIG. 5 illustrates a modification of the brake shown in FIG. 1.

With reference to the drawing figures, and in particular to FIGS. 1 to 4, the padded shoe brake according to this invention has, in a preferred embodiment thereof, a structure which is defined by two pads 1 having a rim contacting surface 1a which is of hollow shape to encompass a wide portion of a wheel rim 8 (FIG. 2a). The rim contacting surface 1a is in practice shaped to mate continuously the portions of the rim 8 which are not occupied by the wheel spokes 10 and which are not covered by the wheel tire.

Moreover, the pads are advantageously associated with control and guiding means which comprise two arms 2 adjacent one section of the wheel, indicated at 7 in FIG. 2, and slidably support the pads 1 through slider-type supports 3, and comprise a flat strip element 4 interconnecting the slider supports 3. The inventive brakes further include elements 5 for engaging the arms 2 with a frame, e.g. a fork 6 of a bicycle, and drive elements 9 adapted for symmetrically moving the pads 1 by acting on the strip element 4.

More in detail, the pads 1 have a rim contacting surface 1a of hollow shape whose shape matches that of the rim 8 such as to almost completely engage both the side surfaces 8a and annular portions 8b of the wheel rim. The directions in which pads 1 are moved to contact the rim 8 substantially coincide with the directions of the bisecting lines of the angles formed by the sides 8a with the related inner annular portions 8b.

This portion of the pads 1 is advantageously defined, in the illustrated embodiment, by said arms 2 being parallel to said bisecting lines and convergent toward each other so as to define a space 11 which substantially accommodates a section of the wheel 7, as shown in FIG. 2. In actual practice, each guiding arm 2 will extend obliquely with respect to the direction of the axis of the wheel 7 and the main extension plane of the wheel. In the embodiment shown in FIGS. 1, 2 and 3, the arms 2 are preferably rigidly connected to each other such as to define a profile element which is bent to a substantially right angle. Said profile element is secured, through a fastening element 5 which comprises a recessed head screw, to the frame, e.g. of a bicycle, thereby preventing any oscillatory movements.

Slidable on the arms 2 which define the profile element are slider supports 3 which have a lug 3a directly supporting a pad 1, and a tubular element 3b rigid with the lug 3a and shaped to slide on one arm 2.

For a precision sliding movement, the arms 2 have of preference an arcuated cross-sectional configuration, and the tubular elements 3 are shaped to mate the latter, but it will be obvious that the shape of the arms 2 may be any desired one.

The slider supports 3 are interconnected together, at ridges 12, by a flat strip or laminar element 4 preferably formed from a resilient sheet and being twisted at the end and bent at the center to follow the shape of the profile element formed by the arms 2. In particular, the strip element 4 is formed in elastically flexible caliper-fashion, so as to follow the mutual approaching and separating movements of the slider supports 3, while normally biasing the latter at a position of maximum mutual distance. In order to increase the tendency of the slider supports 3 to arrange themselves spontaneously away from each other, as the brakes are released, there may be also provided auxiliary springs 13 which are partly embedded in the hollow portion of the arms 2, as shown in FIG. 1.

The driving elements for the pads 1, that is, in practice, for raising the strip element 4, consist, in the cited preferred embodiment, of a control cable 14 known per se and comprising a sleeve 15 which encloses a wire 16 which, at the strip element 4, is attached to a hooked release device 17, movable between an extended opening position (FIG. 1a) and a retracted closing position (FIG. 1). The extended position of FIG. 1a is intended to allow disengagement between the control cable 14 and strip element 4 and consequent sliding separation movement of the slider supports 3 on the arms 2, such as to permit, for example, the removal of the wheel 7. The connection between the control cable 14 and release device 17 is accomplished by means of a bolt 18 which is cross drilled to allow the wire 16 therethrough, in a manner known per se. Also in a conventional manner, upstream of the bolt 18, a front wire anchoring device 19 is provided, as shown in FIG. 1.

To control the pads 1 which act on the rim of the vehicle rear wheel, there is provided, as shown in FIG. 4, a rear wire anchoring device 20, which positions the cable control 14 symmetrically with respect to the frame 27 of the vehicle, in this specific case a bicycle.

FIG. 3 shows how the brake may be coated with a rubber protection 21 which encloses both the arms 2 and, in part, the slider supports 3, to prevent dust and foreign matter from reaching the sliding engagement areas of the tubular elements 3b with the arms 2, as well as to prevent outward leaks of any lubricating oil applied thereat.

According to a first modification of the embodiment shown in FIGS. 1 to 4, and as shown in FIG. 5, the arms 2 are not of a single piece construction, but rather are hingedly connected to each other at their ends of mutual connection, through which the engagement element 5 is passed. At such ends, which form the virtual vertex of the caliper configuration of the brake the inner, mutually engaging surfaces of the arms 2 may take a serrated shape, with side-by-side meshing ribs, as shown in FIG. 5, or any other suitable shape to allow a relative rotation between the arms in the direction of the arrow 22, for the main purpose of spreading of the brake for enabling the wheel to be removed without utilizing the releasing device 17. However, in any event, with the brake in its operating condition, the arms 2 should be locked to each other, without any possibility of mutual rotation, and, therefore, preferably at the hinged connection point between the arms 2 there should be provided on their inner-mating surfaces engagement teeth or friction material, which may exert the locking action upon tightening the arms 2 e.g. by means of linkage 23, described later, onto the frame which supports them and pressing the meshing inner surfaces of the arm 2 against each other.

FIG. 5 also shows that the engagement elements 5 may comprise, in addition to said recessed head screw, the above mentioned cam-action linkage 23, of a type conventionally employed to lock the wheel hubs on a bicycle.

Figure 6:
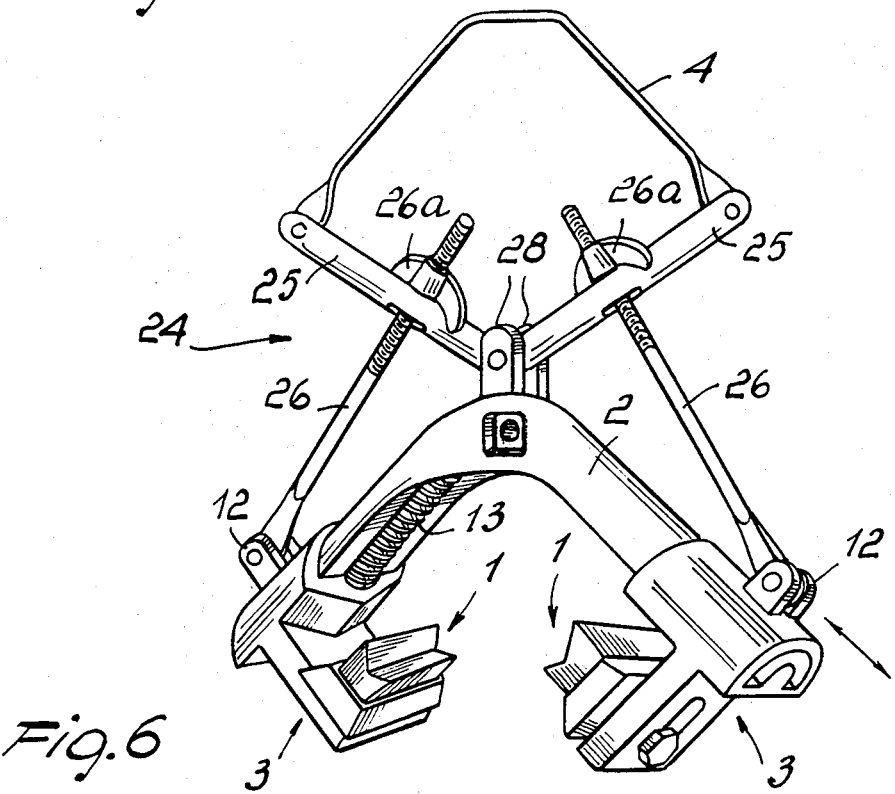
FIG. 6 shows a further modification of the padded shoe brake according to this invention.

A further modification of the invention is illustrated in FIG. 6, where a padded shoe brake similar to that of FIG. 1 is shown, but in which the strip element 4 acts on the slider supports 3, at the location of said lugs 12, through linkages 24 effective to increase the force applied by the pads 1 to the wheel rim. In this specific instance, the linkages 24 comprise a pair of rods 25 which are pivoted to each other with one end, at lugs 28, extending from the vertex area formed by the arms 2, or arranged on the arms themselves. In the latter case, the lugs 28 should be of split construction and the rods 25 would not converge toward each other, and on the whole, a reduction of the brake overall height can be achieved. The linkage 24 further comprise threaded tie rods 26 which connect an intermediate portion of the rods 25 to said lugs 12 on the slider supports 3. The rods 25 engage with the strip element 4 at their ends which are not pivoted to the lugs 28. It should be further noted that the threaded rods 26 are passed through the rods 25 with some clearance and have their lengths adjustable, e.g. by means of wing nuts 26a.

The operation of the padded shoe brake according to this invention is already evident from the foregoing, prevailingly structural, description thereof.

The arms 2 define guides for the movement of the slider supports 3, and accordingly of the pads 1, which allow the pads to be brought closer to the rim 8 along an oblique direction, such as to simultaneously contact both the sides and inner annular portions of the rim. Upon actuation of the related brake lever handle, the cable control 14 will raise the center portion of the strip element 4 to force the slider supports 3 and pads 1 closer to the rim 8 toward the contact position shown in FIG. 2a, where virtually all of the available rim surface is engaged by the pads. The approaching movement of the pads 1 to the rim occurs against the bias provided by the bending resistance of the strip element 4 and by the auxiliary springs 13, where provided. It follows that, upon releasing the brake lever handle, the pads 1 will tend to return to their positions away from the rim 8, thanks to the action of the strip element 4 and of the auxiliary springs 13, where provided. The strip element 4 also ensures, in particular, symmetrical control of both pads 1.

Where necessary, e.g. when a wheel is to be removed from the vehicle, the brake according to the embodiment shown in FIGS. 1 to 3 is to allow an additional sliding movement of the slider supports 3 along the arms 2 in the opening directions. Thus, the releasing device 17 is operated which, upon occupying the position shown in FIG. 1a, will release the strip element 4 and will allow a limited additional sliding movement of the tubular elements 3b on the arms 2 in the opening direction thereby additionally spreading apart the pads 1. In the embodiment of FIG. 5, it is not necessary to slide apart the slider supports 4 in order to remove the wheel, and it will be sufficient, after disengaging the cam linkage 23, to rotate i.e. to expand caliper-fashion the arms 2, which allows the wheel to pass therethrough. Similar considerations to those relating to FIGS. 1 to 4 also apply to the modification of FIG. 6.

The invention achieves its objects and a number of important advantages.

In fact, a novel padded shoe brake is provided which, while being extremely simple and economical, and substantially more so than conventional padded shoe brakes, has a highly efficient braking action, to some extent comparable with that of drum and disk brakes, owing to the large surface area of engagement of the pads with substantially the entire available rim surface in the transverse direction.

Owing to these features, and above all to its reduced weight, the inventive padded shoe brake is definitely superior to all of the brakes currently employed on lightweight two-wheel vehicles.

It should be further noted that the padded shoe brake according to this invention has a proper finished appearance and a symmetrical structure with respect to the frame on which it is installed. Moreover, the brake may be constructed to graduate its braking action, e.g. by means of the linkages described hereinabove.

The invention as herein conceived is susceptible to many modifications and variations in addition to the ones described.

In general, for example, the pad control and guiding means may be variously implemented, and in particular, it may be advantageous to design a pressure fluid type of control for the brake shoes.

In fact the latter may be easily operated by cylinder-piston assemblies: thus, for example, it is possible to couple, either directly or by transmission members, the brake control lever to a small sized hydraulic pump and couple the latter, by means of flexible small hoses, to hydraulic cylinder-piston assemblies adjacent to said laminar elements 4, to thereby actuate the pump by manual action on the brake control lever. More specifically, said hydraulic assemblies could operate the laminar elements 4 by means of the movable stems thereof and they could be located between the arms 2 and said laminar elements 4.

Moreover, the mutual angular relationship of said arms may be differently arranged, and the strip element and release device may be replaced with elements performing a similar function. The pads themselves, moreover, may have a non-symmetrical hollow shape, or be laid alongside the rim with different inclinations from the bisecting lines mentioned above, such as to initially apply their braking action, for example, only to the rim sides, and then both to the sides and inner annular portions of the rim, which makes the contact, and accordingly the braking effect, still more gradual. It would also be possible to differentiate in each pad that portion thereof which is to contact one side of the rim from that portion which is to contact an inner annular portion of the rim, by forming them from different materials.

Furthermore, all of the details may be replaced with technically equivalent elements.

In practicing the invention, the materials used, as well as the shapes and dimensions, may be any selected ones for the intended applications.

I claim:

1. A padded shoe brake particularly for bicycles, comprising a pair of shoe pads adapted to frictionally engage a wheel rim, and shoe pad control and guiding means operative to move said shoe pads to and from said wheel rim while maintaining said shoe pads at a position of substantial symmetry with respect to said wheel rim, wherein said shoe pads have a rim-contacting surface of hollow shape and adapted to continuously encompass both sides and an inner annular portion of said wheel rim, said control and guiding means being mechanically structured to bring said shoe pads closer to said wheel rim along paths substantially terminated between said sides and inner annular portions of said wheel rim, and wherein said control and guiding means comprise two guiding arms located adjacent one section of a wheel and extending obliquely between the direction of the wheel axis and the plane containing said wheel, as well as being convergent toward each other such as to define a seat substantially accommodating said wheel section, two slider supports slidably mounted on said arms and engaging said shoe pads at a position facing said wheel rim, and control elements adapted to symmetrically drive said slider supports along said arms, so as to move said shoe pads into and out of engagement with said wheel rim.

2. A padded shoe brake according to claim 1, characterized in that said guiding arms are integrally formed with each other such as to define a bent profile element the concavity whereof encompasses said wheel.

3. A padded shoe brake according to claim 2, characterized in that said bent profile element is of a single-piece construction.

4. A padded shoe brake according to claim 2, characterized in that said bent profile element is defined by two pieces or arms permanently engageable to each other.

5. A padded shoe brake according to claim 1, characterized in that said slider supports are each provided with a lug engaging one of said shoe pads and with a tubular element mounted slidably on one of said guiding arms and being shaped to mate said guiding arms, said tubular element being rigid with said lug.

6. A padded shoe brake according to claim 5, characterized in that said slider supports are interconnected together by said strip element with the interposition of linkages.

7. A padded shoe brake according to claim 1, characterized in that said guiding arms have a hollow cross-sectional configuration.

8. A padded shoe brake according to claim 1, characterized in that said slider supports are interconnected together by a strip element engaged by said control elements.

9. A padded shoe brake according to claim 8, characterized in that said strip element is formed from a pliable elastic sheet.

10. A padded shoe brake according to claim 8, characterized in that said control elements comprise a cable control and an expandable hooked release device attached to said strip element, said control elements extending centrally and symmetrically on the vehicle frame.

11. A padded shoe brake according to claim 1, characterized in that said control elements comprise auxiliary springs engaged parallel to said guiding arms between one of said slider supports and a fixed detent located at the area of convergence of said guiding arms, said auxiliary springs being compression springs.

12. A padded shoe brake according to claim 11, characterized in that said auxiliary springs are accommodated in the concavity of said guiding arms.

13. A padded shoe brake according to claim 1, characterized in that said arms and said slider supports are substantially coated with a rubber protection.

* * * * *